United States Patent
Zhitnitsky et al.

(10) Patent No.: US 9,668,611 B2
(45) Date of Patent: Jun. 6, 2017

(54) TRIVET

(71) Applicants: Svetlana Zhitnitsky, Fairfax, VA (US);
Rebecca Leigh Brei, Omaha, NE (US);
Ruslana Zhitnitsky, Fairfax, VA (US)

(72) Inventors: Svetlana Zhitnitsky, Fairfax, VA (US);
Rebecca Leigh Brei, Omaha, NE (US);
Ruslana Zhitnitsky, Fairfax, VA (US)

( * ) Notice: Subject to any disclaimer, the term of this patent is extended or adjusted under 35 U.S.C. 154(b) by 0 days.

(21) Appl. No.: 14/431,652

(22) PCT Filed: Oct. 16, 2013

(86) PCT No.: PCT/US2013/065242
§ 371 (c)(1),
(2) Date: Mar. 26, 2015

(87) PCT Pub. No.: WO2014/062803
PCT Pub. Date: Apr. 24, 2014

(65) Prior Publication Data
US 2015/0250357 A1    Sep. 10, 2015

(30) Foreign Application Priority Data
Oct. 17, 2012    (GB) .................................. 1218655.7

(51) Int. Cl.
*A47J 36/34*    (2006.01)
*F16M 11/38*    (2006.01)

(52) U.S. Cl.
CPC .............. *A47J 36/34* (2013.01); *F16M 11/38* (2013.01); *F16M 2200/00* (2013.01)

(58) Field of Classification Search
CPC .............. A47J 36/34; A47J 2037/0795; E05D 11/1007; A47C 1/026; F16M 11/38; F16M 11/10
(Continued)

(56) References Cited

U.S. PATENT DOCUMENTS 1,360,539 A * 11/1920 Laurent .................... G01B 3/06
403/93
2,662,717 A * 12/1953 Johnson .................. A47J 47/16
211/32
(Continued)

FOREIGN PATENT DOCUMENTS

CN    101290084    10/2008
CN    201831461 U    5/2011
(Continued)

OTHER PUBLICATIONS

Notification of Transmittal of the International Search Report and The Written Opinion of the International Searching Authority—Jan. 9, 2014.
(Continued)

*Primary Examiner* — Muhammad Ijaz
(74) *Attorney, Agent, or Firm* — Mallory M. Henninger; Advent, LLP

(57) ABSTRACT

A collapsible trivet comprises a first support section, a second support section, and a connecting member, the first support section being mounted to one end of the connecting member by a first axle and the second support section being mounted to the other end of the connecting member by a second axle, the first and second support sections being pivotable relative to the connecting member and the first support section including two support arms.

12 Claims, 9 Drawing Sheets

(58) Field of Classification Search
USPC ......... 248/423, 166, 157, 176.2, 439, 184.1, 248/183.3, 188.6; 403/53, 55, 61, 96, 403/103, 109.3, 93, 94, 98
See application file for complete search history.

(56) References Cited

U.S. PATENT DOCUMENTS

| | | | | |
|---|---|---|---|---|
| 3,126,664 | A * | 3/1964 | Gibson | A47B 23/043 248/463 |
| 4,336,916 | A * | 6/1982 | Blanchard | F16M 11/00 248/166 |
| 4,897,873 | A * | 1/1990 | Beutler | H04M 1/0216 16/292 |
| 5,038,945 | A | 8/1991 | Melkonian | |
| 5,167,392 | A * | 12/1992 | Henricksen | B60N 3/102 248/311.2 |
| 5,639,053 | A * | 6/1997 | Dmitriev | A47B 23/043 248/453 |
| 5,810,308 | A * | 9/1998 | Lam | A47J 47/16 211/41.11 |
| 6,543,732 | B1 * | 4/2003 | Yuan | B65F 1/1415 248/101 |
| 6,676,098 | B2 * | 1/2004 | Lin | E05D 11/1007 248/371 |
| D544,748 | S * | 6/2007 | Johansson | D7/387 |
| 7,597,302 | B2 | 10/2009 | Lee et al. | |
| 7,987,749 | B2 * | 8/2011 | Hsieh | B25B 23/0028 403/103 |
| D660,644 | S * | 5/2012 | Beijl | D7/213 |
| 8,191,838 | B2 * | 6/2012 | Carter | B60R 11/02 16/367 |
| 8,714,507 | B1 * | 5/2014 | Lee | A47J 36/34 248/152 |
| 8,733,714 | B1 * | 5/2014 | Reitmann | A47J 45/10 220/573.3 |
| 8,783,641 | B2 * | 7/2014 | Lin | F16M 11/10 248/166 |
| 9,062,823 | B2 * | 6/2015 | Pan | F16M 11/10 |
| 9,103,487 | B2 * | 8/2015 | Hale | F16M 13/022 |
| 2004/0065790 | A1 * | 4/2004 | Frey | A47J 47/16 248/146 |
| 2008/0251659 | A1 * | 10/2008 | Matias | A47B 23/044 248/166 |
| 2012/0001045 | A1 | 1/2012 | Wang | |
| 2012/0145865 | A1 | 6/2012 | Wong | |
| 2013/0256492 | A1 * | 10/2013 | Liu | F16M 11/24 248/349.1 |
| 2013/0306807 | A1 * | 11/2013 | Liang | A47B 23/043 248/124.1 |

FOREIGN PATENT DOCUMENTS

| | | |
|---|---|---|
| EP | 1803987 | 7/2007 |
| JP | 2001029201 | 2/2001 |
| JP | 2004081777 | 3/2004 |
| KR | 200214251 | 2/2001 |
| WO | 0130209 A2 | 5/2001 |

OTHER PUBLICATIONS

Chinese Office Action dated Apr. 1, 2016.
Supplementary European Search Report dated Jun. 3, 2016.

* cited by examiner

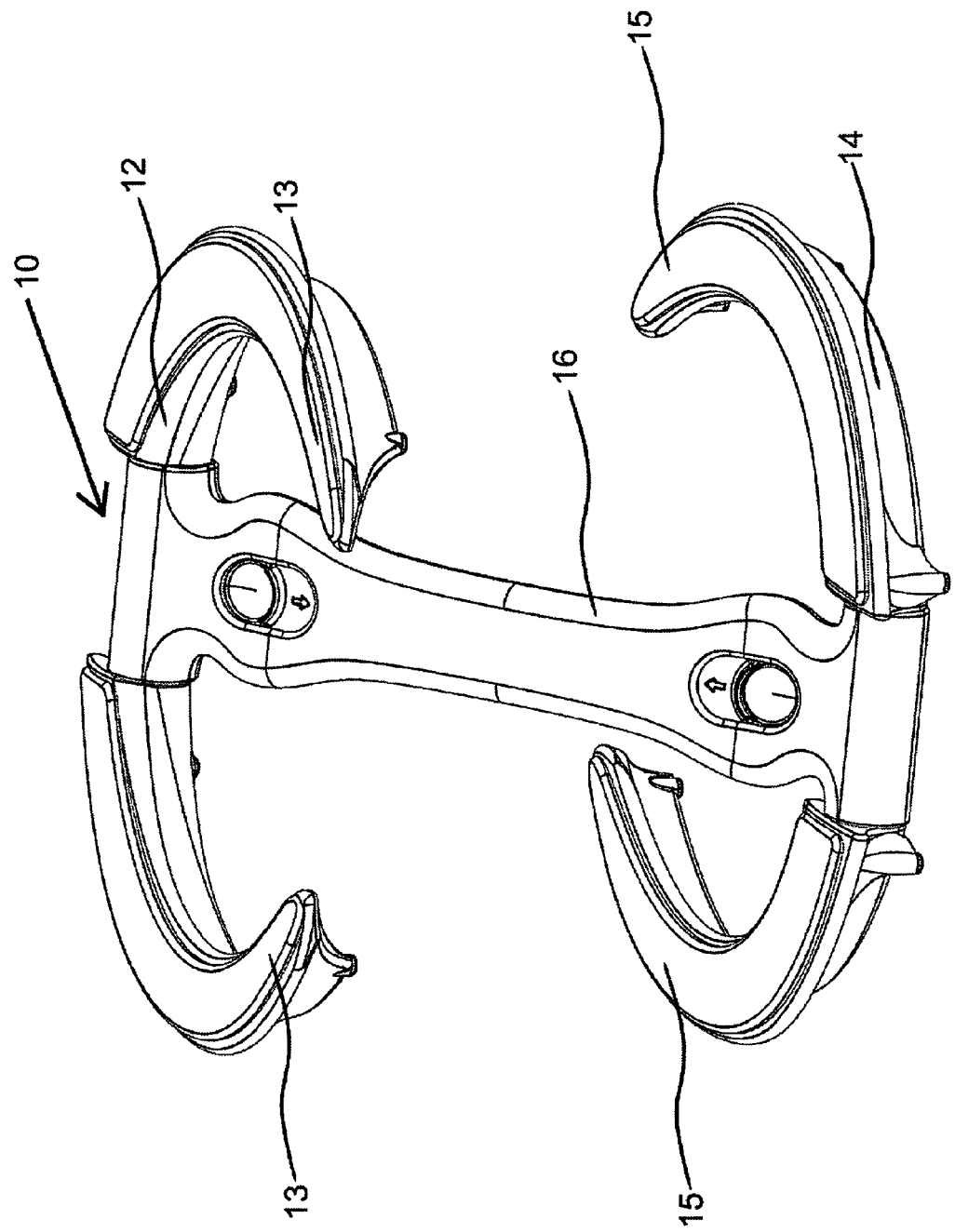

TRIVET

TECHNICAL FIELD

The present disclosure relates to a trivet, and particularly but not exclusively to a trivet for supporting a pan lid.

BACKGROUND

Trivets are well-known, and are widely used to protect surfaces from heat when it is required to rest a pan or other hot object on the surface. Trivets typically comprise a substantially horizontal support member for supporting the hot object. The support member is often made from cast iron, but can be any heat resistant material. The support member may be solid, but often it is apertured. The apertures reduce mass and material cost, both of which are particularly important considerations where the support member is made from cast iron. Legs may also be provided, for spacing the support member and consequently the hot object from the surface.

Conventional trivets are effective for supporting pans. However, it is also sometimes required to support pan lids, for example while a cook is stirring or inspecting the contents of the corresponding pan. Pan lids are inevitably wet, since steam will have condensed on the underside of the lid during cooking The pan lid should therefore ideally be placed upside-down in order to prevent moisture from damaging the surface, especially where the trivet is not solid. Placing the lid upside-down also keeps the surface clean of food residues and the like. However, placing the lid upside-down is difficult on a conventional trivet, or directly on a work surface, because the handle of a pan lid is on its upper side. It is therefore difficult or impossible to reach the handle from underneath a hot pan lid placed on a horizontal surface without burning oneself. A pan lid stored upside down on a surface may also be unstable, and may fall off a worktop.

SUMMARY

According to the present disclosure, there is provided a collapsible trivet comprising a first support section, a second support section and a connecting member, the first support section including two support arms and being pivotally mounted to one end of the connecting member, and the second support section being pivotally mounted to the other end of the connecting member, the trivet being positionable to an open position in which the first and second support members and the connecting member lie substantially flat in the same plane for allowing a dish to be placed across the trivet.

The mountings between the support sections and the connecting member, hereafter referred to as axles, should be understood to include any pivotal mounting.

The trivet is advantageous because it can serve a dual use. When collapsed, the trivet is substantially flat, and can be used to place a hot pan or dish on a tabletop, the trivet protecting the tabletop from heat and water damage. In the open position (e.g., a first open position), each of the first and second support members may support a pan or other object, protecting the surface from heat and moisture. The first and second support members may also together support a single large pan or dish, eliminating the need for multiple trivets, or large and non-foldable trivets. When the support members are pivoted into a second open position, the second support member may rest on the tabletop and a pan lid may be supported upside-down on the first support section. The handle of the pan lid may pass between the two support arms. In this way, a pan lid can be stored whilst a cook is, for example, stirring or inspecting the contents of the corresponding pan. The pan lid is suspended from the surface so that the surface is not damaged. The pan lid is also upside-down so that condensate does not drip from the lid onto the work surface, and the underside is not in contact with any surface, which is advantageous for preserving food hygiene. When the pan lid is required again, the cook can reach underneath the first support section and grasp the handle of the pan lid, before sliding the pan lid off the first support section between the two support arms.

The second support section may include two support arms. In this case, the first support section is substantially identical to the second support section, and the trivet can be used either way up. However, in other embodiments, the first support section and the second support section are different. For example, one support section can be smaller than the other support section. Further, the first and second support sections can be shaped differently, and so forth.

The trivet may be positionable to a second open position. In the second open position, the first and second support members may be substantially perpendicular to the connecting member with the first and second support members facing each other. In other embodiments, the first and second support members are substantially parallel to one another in the second open position, and the connecting member is at an acute angle to each of the first and second support members.

In the second open position, the trivet can be deployed on a kitchen worktop with the second support member resting on the worktop. The first support member is thus supported at a height of several inches above the worktop, above (e.g., directly above) the second support member and connected to the second support member by the connecting member. An item of some mass, for example a pan lid, can then be placed on the first support member, and will be kept clear of the worktop.

The trivet may also be positionable to a collapsed position, in which the first support member may be substantially adjacent to and parallel with the second support member and the connecting member may be at an acute angle to each of the first and second support members.

When collapsed, the trivet may be placed on a worktop and used to support a pan or other object, protecting the worktop from damage caused by heat or moisture. The collapsed trivet may also be stored horizontally or vertically, taking up minimal space and allowing for ease of portability. In the collapsed position, the first and second support members may abut one another. The first support member, connecting member and second support member may be folded in a concertina fashion. The connecting member therefore passes between the two axles at a slight angle to the first support section and the second support section. This configuration allows the trivet to fold flat (e.g., completely flat), allowing for use as a conventional trivet in the collapsed position.

The trivet may therefore be used as a small trivet in the collapsed position, as a larger trivet in the first open position, and as a pan lid holder in the second open position.

The trivet may have a first axle mounting the first support section to the connecting member, and a second axle mounting the second support section to the connecting member.

A retractable bolt may extend from the connecting member for engaging with a slot in at least one of the axles, locking the corresponding support section in position and preventing pivoting. Retractable bolts may be provided at each end of the connecting member for locking both sections in position, preventing pivoting, and multiple slots may be provided in at least one of the axles, for locking at least one of the support sections in at least two different positions. The retractable bolt serves to lock the trivet in at least one of the collapsed position, the first open position and the second open position. This prevents accidental pivoting, and in particular keeps the stand in the second open position from collapsing.

The retractable bolt or bolts may be operable by a moveable operating member, which may extend from a side of the connecting member and may be movable in a direction perpendicular to an elongate extent of the connecting member. For example, two operating members may extend from opposing sides of the connecting member, and may be movable in a direction perpendicular to an elongate extent of the connecting member. The operating member or members may be movable from a locked position in which the operating member(s) are further from a central axis of the connecting member and the bolt or bolts are extended, and an unlocked position in which the operating member(s) are closer to the central axis of the connecting member and the bolt or bolts are retracted. In other embodiments, one or more operating members extend longitudinally along the connection member. The operating member or members may be movable from a locked position in which the operating member(s) are closer to an axle and the bolt or bolts are extended, and an unlocked position in which the operating member(s) are further from an axle and the bolt or bolts are retracted.

Providing operating members on opposing sides of the connecting member allows for easy release of the bolts, whilst making accidental release unlikely. The user can squeeze together the operating members on either side of the connecting member and release the bolt or bolts, pivot the support sections into their required new positions, and then release the operating members to lock the support members into position. Similarly, providing operating members at opposing ends of the connecting member proximate to an axle allows an operator to slide the operating members toward the center of the connecting member to release the bolt or bolts, pivot the support sections into their required new positions, and then release the operating members to lock the support members into position.

Biasing members may be provided for biasing the operating member(s) into the locked position. This ensures that, when the user is not positively adjusting the positions of the first and second support sections, the trivet will be locked securely in position. The biasing members may be provided by at least one spring, acting to provide an outward force on the operating member(s) and urging the operating member (s) away from the connecting member.

The support arms may be made from, or covered with, a heat resistant material. This allows the trivet to safely support a hot object, for example a pan which has just been removed from a stove, in any of the collapsed position, the first open position and the second open position. The connecting member may also be made from or covered with a heat resistant material. This allows all parts of the trivet to be used to support a hot object in the first open position. However, the trivet may support hot objects in other positions as well.

A flexible section may be provided on the end of at least one of the support arms. The flexible section allows the shape of the support section to be adjusted for fitting different types of pan lids.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

FIG. 7 is a perspective view of a trivet in a second open position in accordance with an example embodiment of the present disclosure.

DETAILED DESCRIPTION

Figure 1:
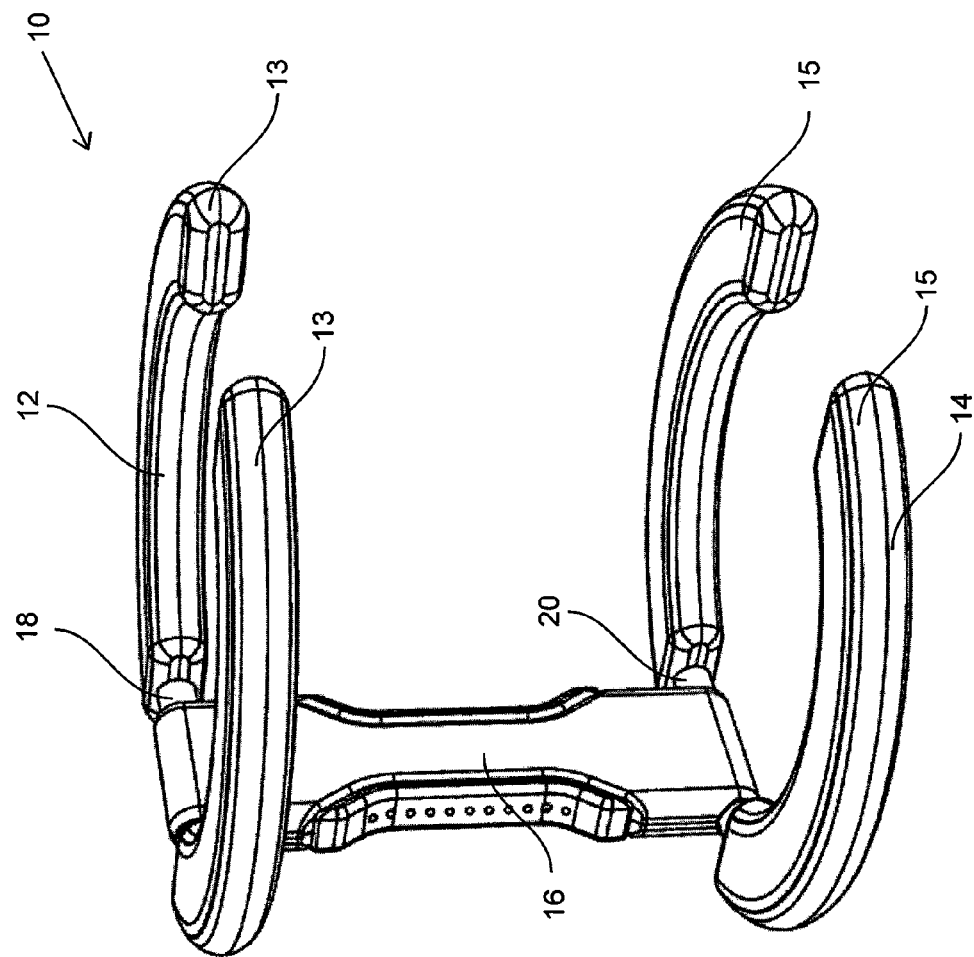
FIG. 1 is a perspective view of a trivet in a second open position in accordance with an example embodiment of the present disclosure.

Referring firstly to FIG. 1, a collapsible trivet is indicated generally at 10. The trivet comprises a first support section 12, a second support section 14, and a connecting member 16. The first support section 12 comprises a pair of support arms 13, and the second support section 14 likewise comprises a pair of support arms 15.

The support arms 13, 15 are curved, with the concave sides facing each other in each pair 13, 15. The support arms of each pair are connected to each other at one end via an axle 18, 20. Between the other ends of the support arms of each pair, opposite the axle 18, 20, there is a space between the support arms. The axle is fixed to the end of each support arm so that neither support arm in the pair may move with respect to the other support arm of the same pair, or with respect to the axle itself. The support arms and the axle combine to form a support section in the shape of a broken hoop.

The axles 18, 20 are pivotally mounted on either end of the connecting member 16, so that the support sections 12, 14 may pivot on the connecting member 16. Thus the trivet is movable between a first open position, a second open position, and a collapsed position.

In FIG. 1, the trivet is shown in a second open position, in which it is suitable for supporting an upside-down pan lid. In the second open position, the first support member is positioned directly above the second support member, the first and second support members each being perpendicular to the connecting member. The pan lid can be slid onto the first support section 12, the handle of the lid passing through the gap between the support arms 13. Due to the space between the first and second support sections 12, 14, a user can easily reach under the first support section 12 to grasp the handle and retrieve the pan lid.

Figure 2:
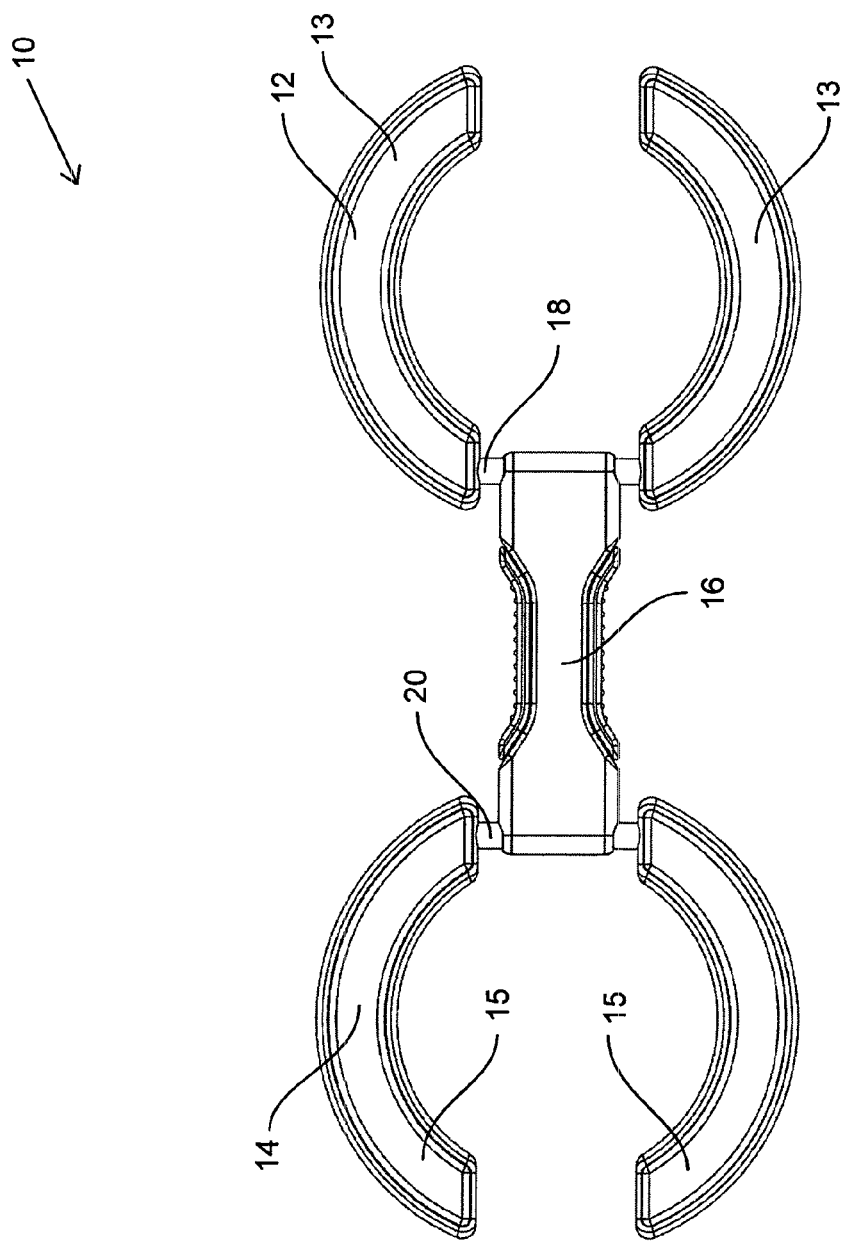
FIG. 2 is a perspective view of the trivet of FIG. 1 in a first open position.
Figure 8:
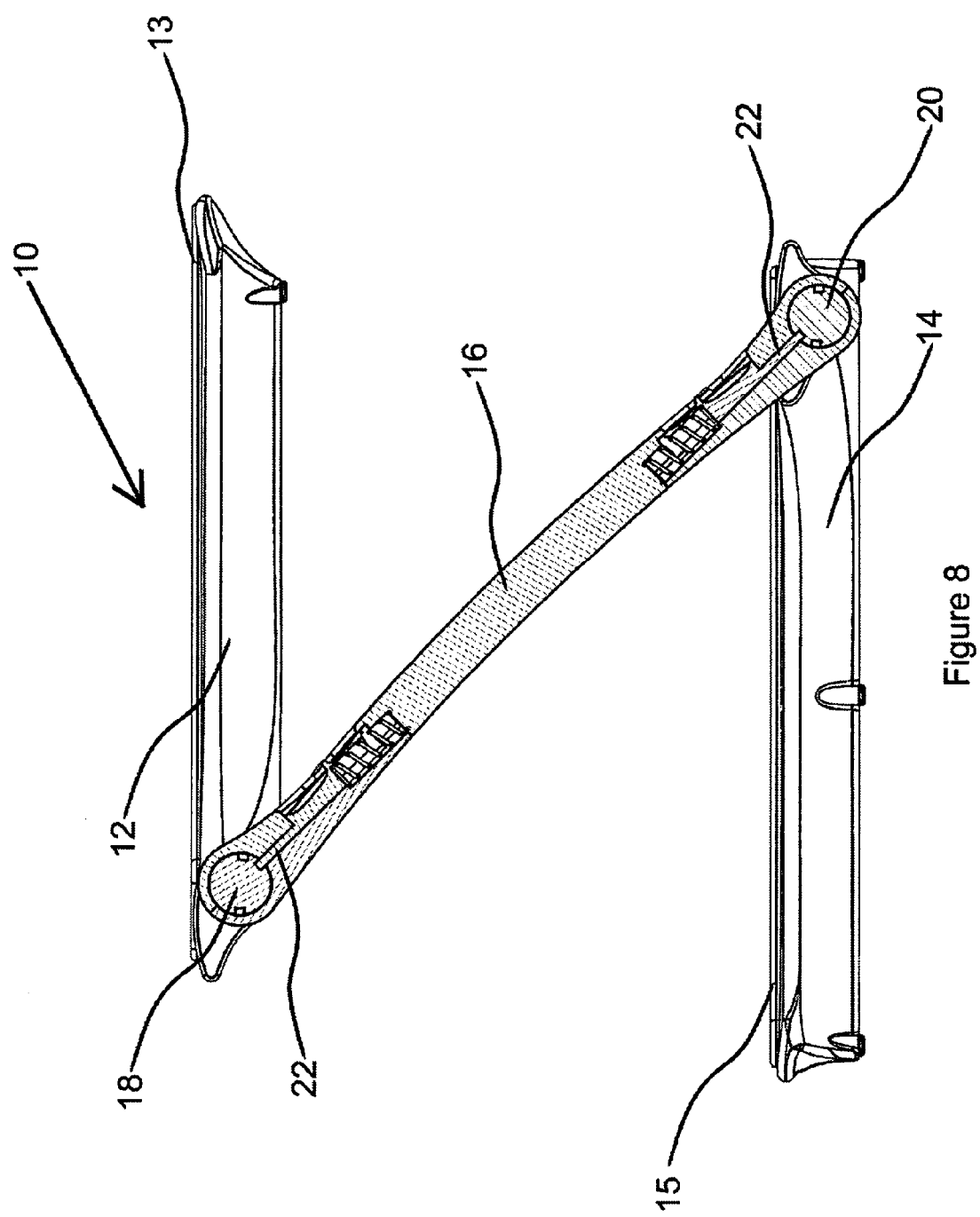
FIG. 8 is a side cut-away view of the trivet of FIG. 7.

In FIG. 2, the trivet is shown in a first open position. In the first open position, the first support section 12, second support section 14, and the connecting member 16 all lie in the same plane, with the connecting member 16 between the first and second support sections 12, 14. The entire trivet in the first open position is rested on a surface, and the first and second support sections can each support a hot object, for example a pan which has just been taken off a stove. Alternatively, a single larger pan or dish may be placed across the first and second support sections 12, 14 and the connecting member 16. For this purpose, all of the first and second support sections 12, 14 and the connecting member 16 may be made from or coated in a heat resistant material. In other embodiments, one side or both sides of the first support section 12, the second support section 14, and/or the connecting member 16 may be coated with a heat resistant material (e.g., silicone). For example, as shown in FIGS. 7 and 8, one side of each of the first support section 12, the second support section 14, and the connecting member 16 may be coated with silicone.

Figure 3:
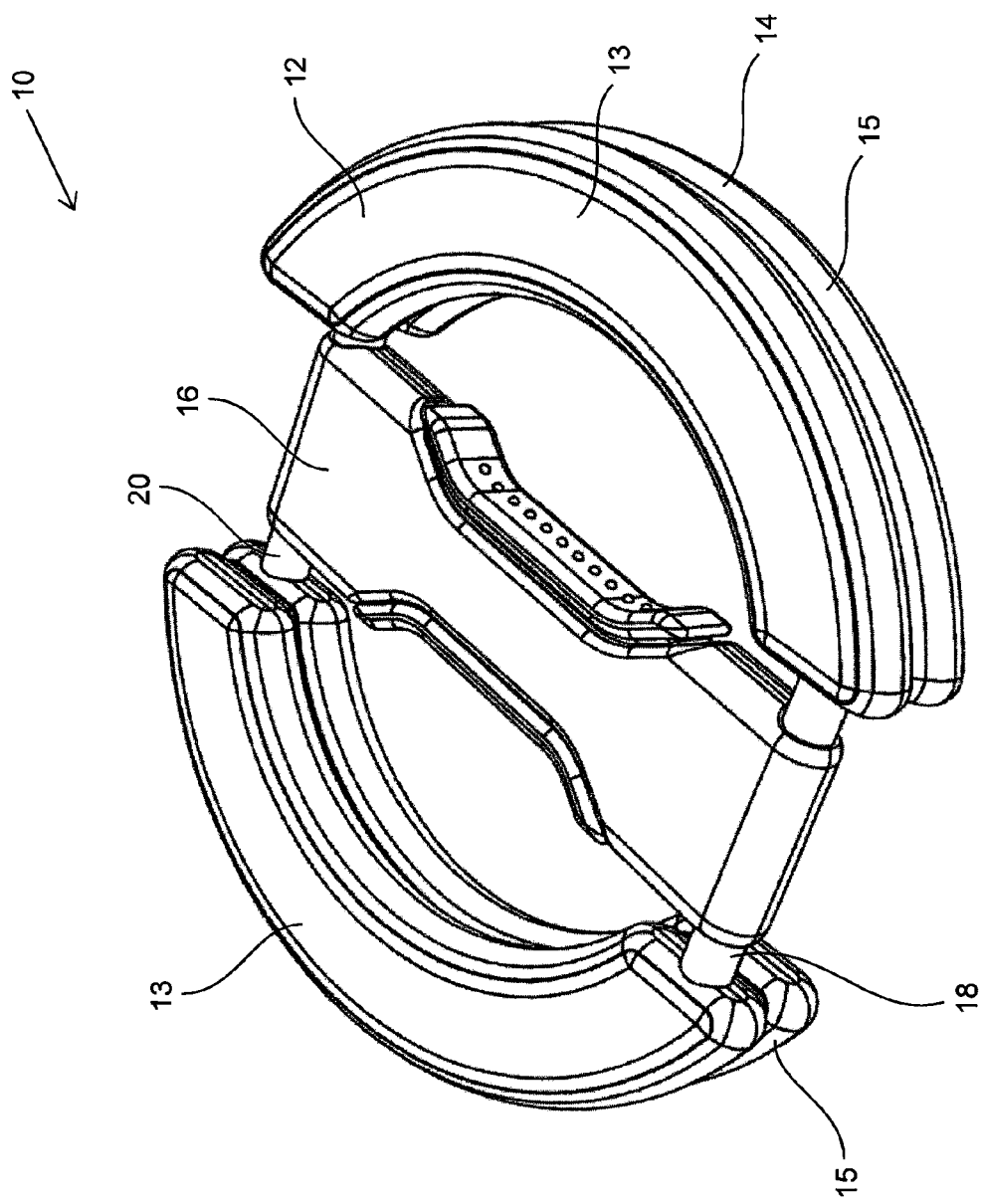
FIG. 3 is a perspective view of the trivet of FIG. 1 in a collapsed position.

In FIG. 3, the trivet is shown in a collapsed position. The collapsed position is primarily for compact storage, but may also be used to support one pan or other hot object.

Figure 4:
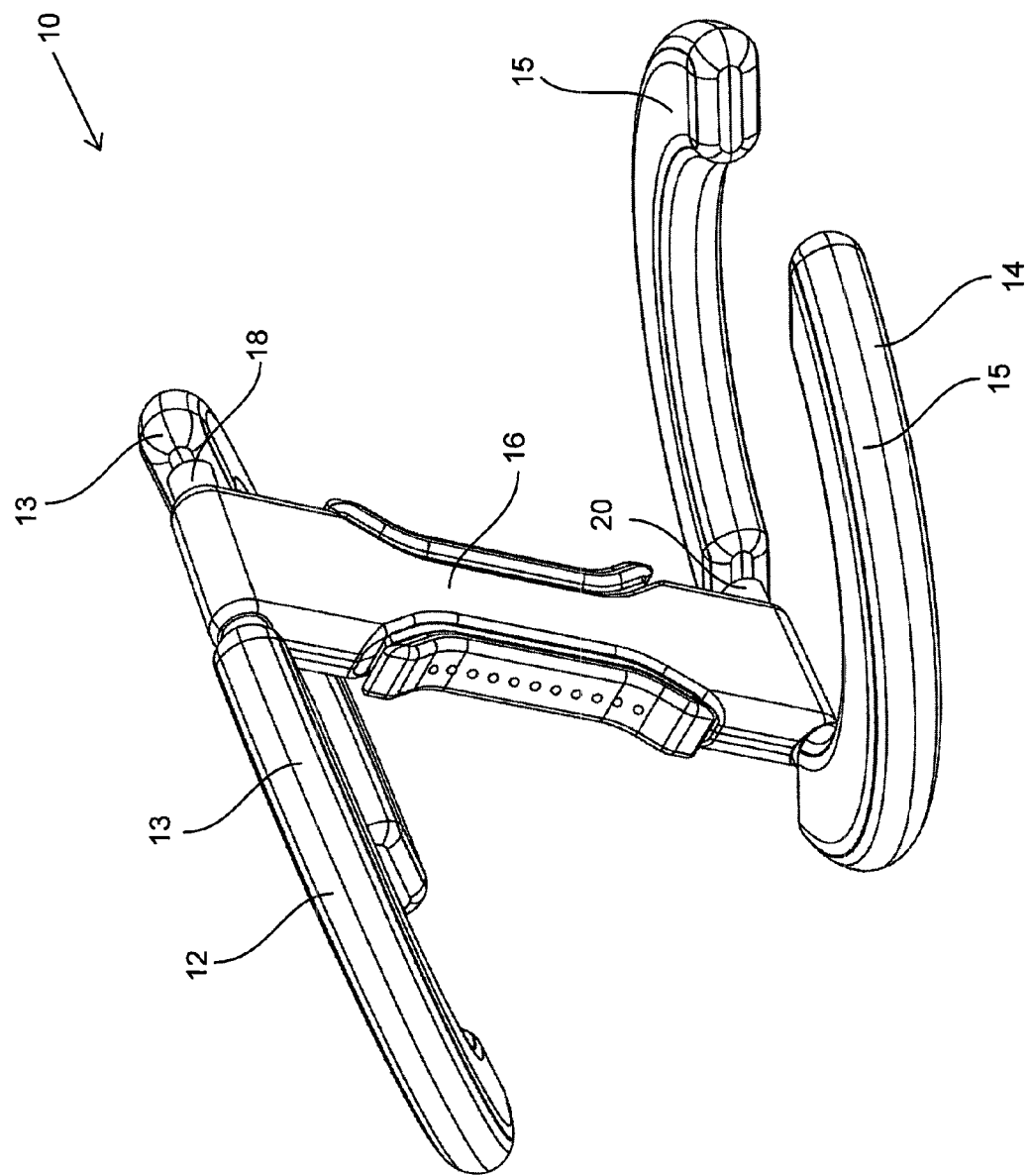
FIG. 4 is a perspective view of the trivet of FIG. 1 in a transitional position.

In FIG. 4, the trivet is being moved from the second open position to the collapsed position. First support section 12 is rotated anticlockwise as viewed by approximately 270 degrees, and second support section 14 is rotated anticlockwise as viewed by approximately 90 degrees. The first and second support sections 12, 14 are therefore folded towards opposing sides of the connecting member 16. In other words, the trivet 10 is folded in a concertina fashion. The advantageous result of this folding arrangement can be seen in FIG. 3. The trivet in the collapsed position is compact as the first support section 12 is able to fully abut the second support section 14. The connecting member passes between the first and second support sections 12, 14, at a small acute angle to each. The axle 18 of the first support section 12 is in line with the gap between the support arms 15 of the second support section 14, and the axle 20 of the second support section is in line with the gap between the support arms 13 of the first support section 12. The support sections 12, 14 and connecting member 16 do not therefore obstruct each other. The trivet 10 is able to be folded flat without requiring disassembly. The connecting member 16 has an elongate extent similar to the diameter of the hooped support sections 12, 14. As a result, the parts fit together when folded and take up minimal space.

Figure 5:
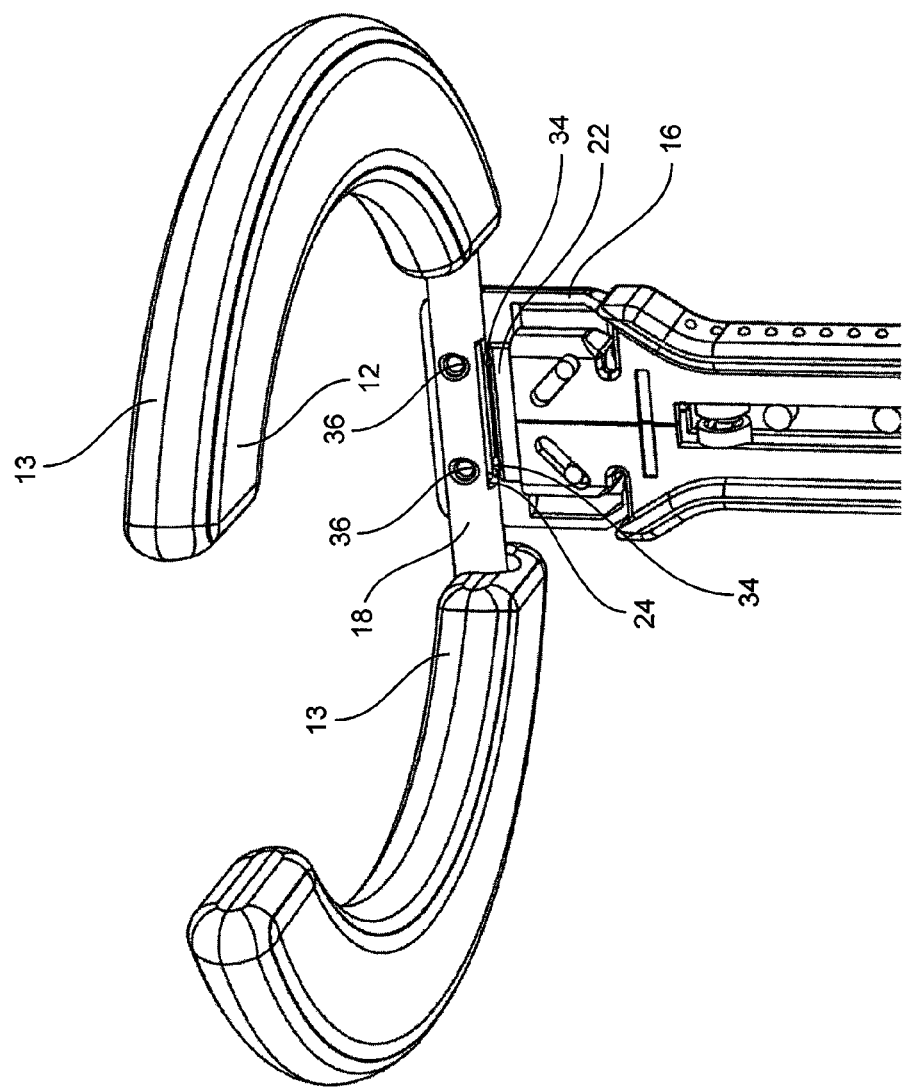
FIG. 5 is a perspective close-up cut-away view of part of the trivet of FIG. 1.

Referring now to FIG. 5, retractable sliding bolts 22 are provided in each end of the connecting member 16. Slots 24 are provided in the axles 18, 20, and the bolts 22 are sized and positioned to engage in the slots 24 when they are extended. The bolts 22 therefore act to lock the axles 18, 20. When the axles are locked, the first and second support sections 12, 14 are prevented from pivoting with respect to the connecting member 16.

Figure 6A:
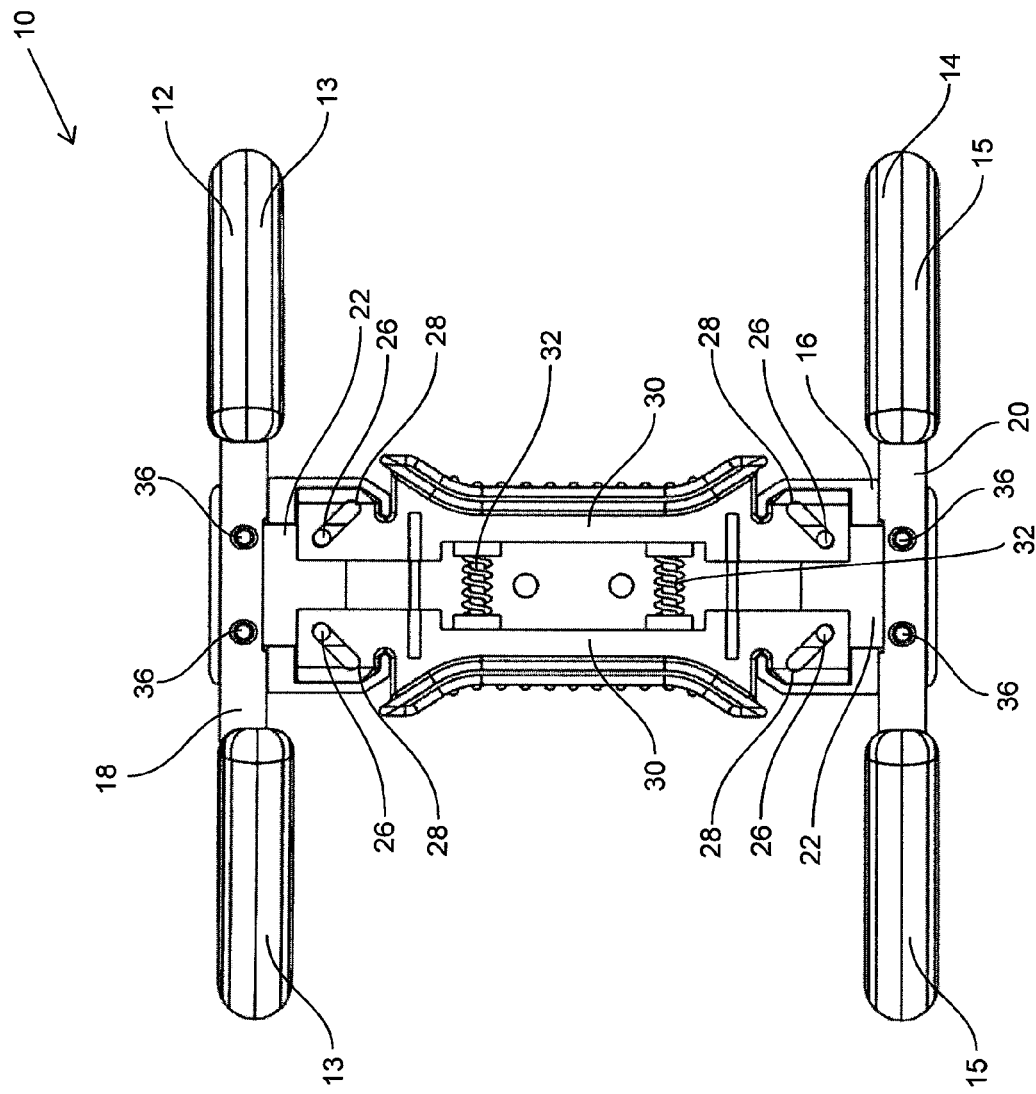
FIG. 6a is a rear cut-away view of the trivet of FIG. 1, in which bolts are extended.
Figure 6B:
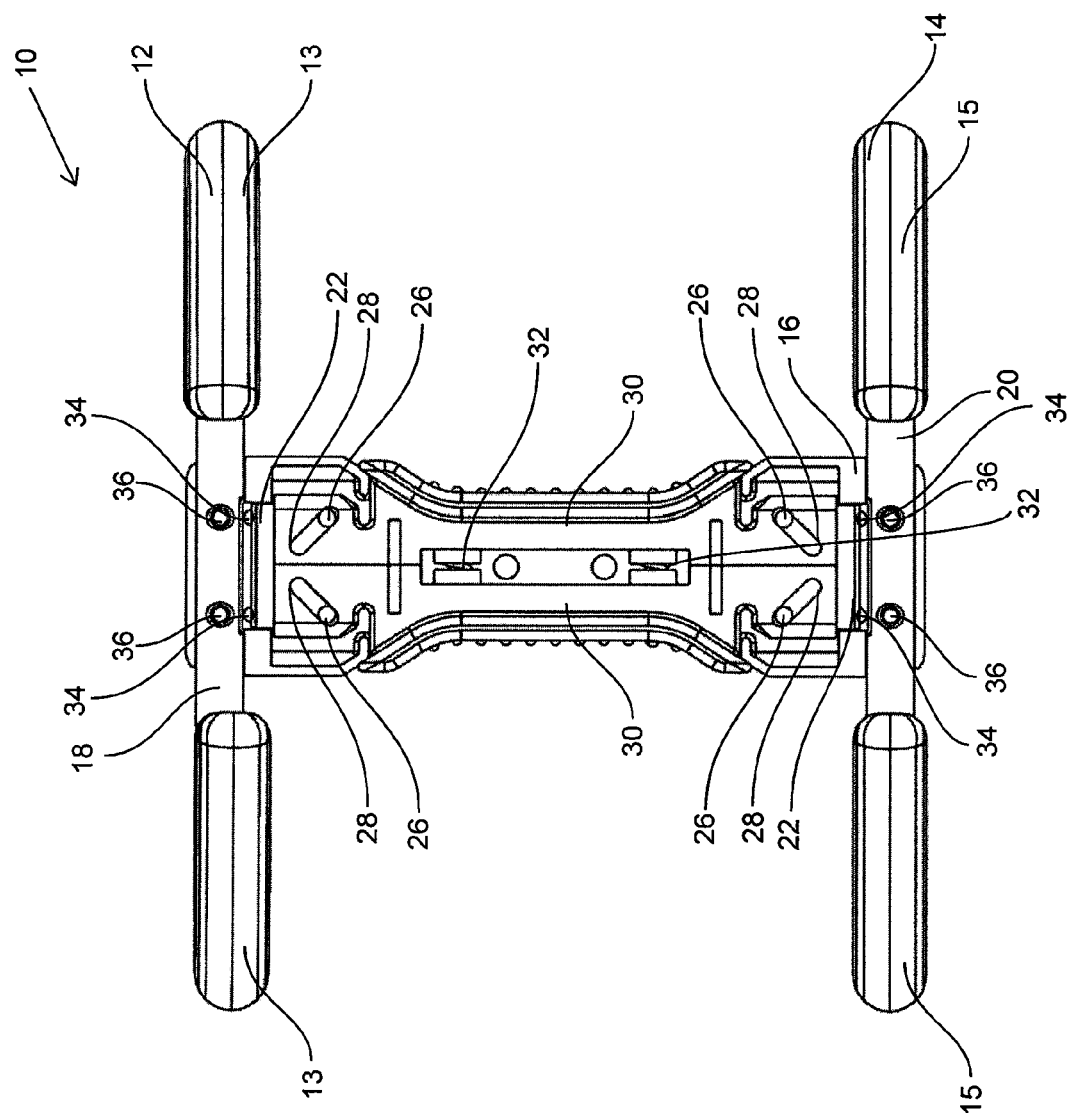
FIG. 6b is a rear cut-away view of the trivet of FIG. 1, in which the bolts are retracted.

Referring now to FIGS. 6a and 6b, two pins 26 extend from a surface of each bolt 22. Cam tracks 28 are provided in the operating members 30 and are formed as diagonal slots. The pins 26 on the bolts 22 act as cam followers, engaging with and sliding within the cam tracks 28. As the operating members 30 are moved inwards, the pins 26 move within the cam tracks 28, forcing the bolts 22 outwards. The operating members 30 form a sleeve around the bolts 22, the bolts 22 being guided in the sleeve so that they move in a straight line, parallel to the length of the connecting member 16. The operating members extend from opposing sides of the connecting member 16, and two springs 32 are provided between operating members 30, urging the operating members 30 away from each other. The bolts 22 are therefore biased into the extended, or locked, position.

When it is desired to retract the bolts 22 in order to adjust the position of the first and second support sections 12, 14 with respect to the connecting member 16, the user may grip the operating members 30 and squeeze them towards each other. The bolts 22 retract when the operating members 30 are squeezed together. When the user's grip is released, the bolts 22 extend into the slots 24 in the axles, locking the first and second support sections 12 and 14 into position. It is therefore possible to adjust the trivet 10 between the first and second open positions and the collapsed position. Further, in some embodiments, when the operating members 30 are not engaged and the bolts 22 do not extend into the slots 24 in the axles (e.g., at an intermediate (unlocked) position), the first and second support sections 12 and 14 will rotate until they reach an index (locked) location. The bolts 22 then extend into the slots 24 in the axles, locking the first and second support sections 12 and 14 into position.

Ball catches 34 are provided on the end of bolts 22. The ball catches 34 each comprise of a ball bearing, which is biased outward of the bolt 22 by a spring. Alternatively, static formations may protrude from the end of bolts 22, providing a simpler construction. When the trivet 10 is in the collapsed position, the ball catches 34 locate in formations 36 on the axles. The trivet 10 in the collapsed position therefore requires positive force to unfold.

In FIGS. 7 and 8, another trivet is shown in a second open position, in which it is suitable for supporting an upside-down pan lid. In the second open position, the first support member is positioned above (e.g., directly above) the second support member, and the connecting member is at an acute angle (e.g., about forty-five degrees (45°)) with respect to each of the first and second support members. The pan lid can be slid onto the first support section 12, the handle of the lid passing through the gap between the support arms 13. Due to the space between the first and second support sections 12, 14, a user can easily reach under the first support section 12 to grasp the handle and retrieve the pan lid.

The trivet can be used in any of the three positions. In the second open position, it can support a pan lid, preventing contamination. In the first open position and the collapsed position, the trivet can be used conventionally to protect a surface from a hot pan. In the collapsed position, the trivet is compact for easy storage.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A collapsible trivet comprising:
a first support section;
a second support section; and
a connecting member having a first end and an opposing second end, the first support section including two support arms and being pivotally mounted to one of the first end or the second end of the connecting member, and the second support section being pivotally mounted to the other of the first end or the second end of the connecting member, the collapsible trivet being positionable to a first open position where the first support section, the second support section, and the connecting member lie substantially flat in a same plane to allow a dish to be placed across the collapsible trivet, wherein a first axle pivotally mounts the first support section to the connecting member, and a second axle pivotally mounts the second support section to the connecting member, at least one of the first axle or the second axle comprising a slot and a locking mechanism, wherein the slot is configured to receive the locking mechanism that moves in a direction parallel to a longitudinal axis of the connecting member to prevent pivoting of at least one of the first support section or the second support section when the locking mechanism engages the slot, wherein the locking mechanism comprises a retractable bolt that extends from the connecting member for engaging with the slot formed in the at least one of the first axle or the second axle, for locking at least one of the first support section or the second support section in a locked position and preventing pivoting of the at least one of the first support section or the second support section, and the retractable bolt is operable by a moveable operating member configured to move in the direction parallel to the longitudinal axis of the connecting member.

2. The collapsible trivet as recited in claim 1, wherein the second support section includes two support arms.

3. The collapsible trivet as recited in claim 1, wherein the collapsible trivet is positionable to a second open position where the first support section and the second support section are disposed at least one of substantially perpendicular to the connecting member or at acute angles to the connecting member, and the first support section and the second support section face each other.

4. The collapsible trivet as recited in claim 1, wherein the collapsible trivet is positionable to a collapsed position where the first support section is substantially adjacent to and parallel with the second support section, and the connecting member is at an acute angle with respect to each of the first support section and the second support section.

5. The collapsible trivet as recited in claim 1, wherein the support arms are at least one of made from a heat-resistant material or covered with the heat-resistant material.

6. The collapsible trivet as recited in claim 1, wherein the connecting member is at least one of made from a heat-resistance material or covered with the heat-resistant material.

7. A collapsible trivet comprising:
a first support section;
a second support section; and
a connecting member having a first end and an opposing second end, the first support section including two support arms and being pivotally mounted to one of the first end or the second end of the connecting member, and the second support section being pivotally mounted to the other of the first end or the second end of the connecting member, the collapsible trivet being positionable to a first open position where the first support section, the second support section, and the connecting member lie substantially flat in a same plane to allow a dish to be placed across the collapsible trivet, wherein a first axle pivotally mounts the first support section to the connecting member, and a second axle pivotally mounts the second support section to the connecting member, the first axle comprises a first slot and a first locking mechanism wherein the first slot is configured to receive the first locking mechanism that moves in a direction parallel to a longitudinal axis of the connecting member to prevent pivoting of the first support section when the first locking mechanism engages the first slot the second axle comprises a second slot and a second locking mechanism wherein the second slot is configured to receive the second locking mechanism that moves in the direction parallel to a longitudinal axis of the connecting member to prevent pivoting of the second support section when the second locking mechanism engages the second slot the first locking mechanism comprises a first retractable bolt that extends from the connecting member for engaging with the first slot formed in the first axle, to lock the first support section in a first support section locked position and preventing pivoting of the first support section, and the first retractable bolt is provided at the first end of the connecting member and the second locking mechanism comprises a second retractable bolt that extends from the connecting member for engaging with the second slot formed in the second axle, to lock the second support section in a second support section locked position, and the first retractable bolt is provided at the first end of the connecting member.

8. The collapsible trivet as recited in claim 7, wherein the retractable bolts are simultaneously operable by a moveable operating member.

9. The collapsible trivet as recited in claim 8, wherein the moveable operating member extends from a side of the connecting member, and is movable in a direction perpendicular to an elongate extent of the connecting member.

10. The collapsible trivet as recited in claim 9, wherein the moveable operating member is movable to an operating member locked position where the moveable operating member is further from a central axis of the connecting member and the bolts are extended, and an operating member unlocked position where the moveable operating member is closer to the central axis of the connecting member and the bolts are retracted.

11. The collapsible trivet as recited in claim 10, wherein a biasing member is provided for biasing the moveable operating member into the locked position.

12. The collapsible trivet as recited in claim 11, wherein the biasing member comprises at least one spring acting to provide an outward force on the moveable operating member and urge the moveable operating member away from the connecting member.

* * * * *